United States Patent
Han

(10) Patent No.: US 11,711,456 B2
(45) Date of Patent: Jul. 25, 2023

(54) FLEXIBLE DISPLAY DEVICE AND FLEXIBLE DISPLAY APPARATUS

(71) Applicant: Wuhan China Star Optoelectronics Semiconductor Display Technology Co., Ltd., Wuhan (CN)

(72) Inventor: Wen Han, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/047,466

(22) PCT Filed: Jun. 18, 2020

(86) PCT No.: PCT/CN2020/096681
§ 371 (c)(1),
(2) Date: Oct. 14, 2020

(87) PCT Pub. No.: WO2021/248519
PCT Pub. Date: Dec. 16, 2021

(65) Prior Publication Data
US 2023/0130073 A1 Apr. 27, 2023

(30) Foreign Application Priority Data
Jun. 8, 2020 (CN) .......................... 202010510274.0

(51) Int. Cl.
H04M 1/02 (2006.01)
(52) U.S. Cl.
CPC ....... H04M 1/0268 (2013.01); H04M 1/0214 (2013.01); H04M 2201/38 (2013.01)

(58) Field of Classification Search
CPC ............ H04M 1/0268; H04M 1/0214; H04M 2201/38
See application file for complete search history.

(56) References Cited

U.S. PATENT DOCUMENTS

| 10,461,275 | B2* | 10/2019 | Wang | ......................... B32B 5/22 |
| 11,048,305 | B1* | 6/2021 | Ye | .......................... G06F 1/1681 |
| 11,481,003 | B2* | 10/2022 | Cho | ....................... G06F 1/1652 |
| 11,587,473 | B2* | 2/2023 | Feng | ....................... G09F 9/301 |
| 11,612,065 | B2* | 3/2023 | Wu | ....................... H05K 5/0226 |

(Continued)

FOREIGN PATENT DOCUMENTS

| CN | 109903679 A | 6/2019 |
| CN | 110211497 A | 9/2019 |

(Continued)

*Primary Examiner* — Lewis G West
(74) *Attorney, Agent, or Firm* — Nathan & Associates; Menachem Nathan

(57) ABSTRACT

A flexible display device and a flexible display apparatus are provided. The flexible display device includes a flexible display module; an attaching frame fixed and connected with the flexible display module; a bending component disposed below the flexible display module, and fixed and connected with the attaching frame; and an elastic layer disposed between the flexible display module and the bending component, and attached on a bottom of the flexible display module. The elastic layer is bendable around a bending axis. Thus, the characteristics of easy assembling and flatness can be improved.

7 Claims, 5 Drawing Sheets

(56) References Cited

U.S. PATENT DOCUMENTS

| | | | | |
|---|---|---|---|---|
| 2010/0246103 A1* | 9/2010 | Visser | G06F 1/1681 | 361/679.01 |
| 2011/0095975 A1* | 4/2011 | Hwang | H04W 4/12 | 345/156 |
| 2014/0361004 A1* | 12/2014 | Jang | H05B 1/0294 | 219/494 |
| 2016/0048169 A1* | 2/2016 | Yang | G02F 1/133305 | 361/749 |
| 2016/0070306 A1* | 3/2016 | Shin | H04M 1/0268 | 361/679.27 |
| 2017/0047547 A1* | 2/2017 | Son | H10K 77/111 | |
| 2017/0194580 A1* | 7/2017 | Lee | H10K 50/8445 | |
| 2018/0164852 A1* | 6/2018 | Lim | H04M 1/0214 | |
| 2019/0132947 A1* | 5/2019 | Koo | G06F 1/1652 | |
| 2019/0302850 A1* | 10/2019 | Park | G06F 1/1616 | |
| 2019/0326530 A1* | 10/2019 | Chen | H10K 59/00 | |
| 2020/0243780 A1* | 7/2020 | Dong | H10K 71/00 | |
| 2020/0371273 A1* | 11/2020 | Hou | G02B 1/111 | |
| 2021/0065589 A1 | 3/2021 | Wang et al. | | |
| 2021/0267073 A1* | 8/2021 | Fan | G06F 1/1616 | |
| 2022/0091689 A1* | 3/2022 | Kishimoto | G06F 1/1643 | |
| 2022/0191312 A1* | 6/2022 | Yan | H04M 1/0214 | |
| 2022/0287189 A1* | 9/2022 | Kim | H05K 5/0226 | |
| 2022/0295655 A1* | 9/2022 | Zhu | G06F 1/1652 | |
| 2022/0322547 A1* | 10/2022 | Wang | H05K 5/0017 | |
| 2022/0413548 A1* | 12/2022 | Sun | G06F 1/1681 | |

FOREIGN PATENT DOCUMENTS

| | | |
|---|---|---|
| CN | 110517588 A | 11/2019 |
| CN | 110649087 A | 1/2020 |
| CN | 110827693 A | 2/2020 |
| CN | 110992828 A | 4/2020 |
| CN | 111508357 A | 8/2020 |
| CN | 111508370 A | 8/2020 |
| WO | 2020060134 A1 | 3/2020 |

* cited by examiner

FLEXIBLE DISPLAY DEVICE AND FLEXIBLE DISPLAY APPARATUS

FIELD DISCLOSURE

The present disclosure relates to the technical field of displays, and in particular to a flexible display device and a flexible display apparatus.

BACKGROUND OF DISCLOSURE

Recently, applications of flexible display devices have attracted more attentions in the market. Flexible screen mobile phones refer to mobile phones with a bendable and flexible screen. Compared with conventional screens, the flexible screen has obvious advantages. The flexible screen is not only thin and light but also has the power consumption lower than the power consumption of an existing device, which facilitates improving the battery life of display apparatuses. Moreover, based on the characteristics of bendability and flexibility, the durability of the flexible screen is greatly higher than the durability of existing screens, and a possibility of accidental damage of the apparatuses is reduced. In order to achieve a folding function of the flexible screen, the flexible screen itself must have desirable characteristics of bending and flatness.

SUMMARY OF INVENTION

Technical Problems

In the existing technique, a flexible display device includes a front frame, a flexible display module, a metal bending layer, a supporting layer, bending components, etc. The metal bending layer below the flexible display module is a layer of thin material with integrity which improves unevenness and creases. The material cannot be too thick. If the material is too thick, the strength of the material is high, but a bending performance is poor. The supporting layer is only distributed in an upper unbendable region and a lower unbendable region, wherein a material of the supporting layer is thick, and the strength of the material is high, so as to support the flexible display panel and achieve the convenience of the whole-device assembling. Because the supporting layer is separated by the bendable region, and there is also a segment difference in the middle bendable region, the flatness of the whole device is difficultly be ensured, which means the characteristics of easy assembling and flatness are poor, and the cost is also high.

Therefore, it is necessary to provide a flexible display device and a flexible display apparatus to improve the technical problems stated above.

Technical Solutions

In a first aspect, an embodiment of the present disclosure provides a flexible display device. The flexible display device includes a flexible display module; an attaching frame fixed and connected with the flexible display module; a bending component disposed under the flexible display module, and fixed and connected with the attaching frame; and an elastic layer disposed between the flexible display module and the bending component, and attached on a bottom of the flexible display module, wherein the elastic layer is bendable around a bending axis.

The elastic layer includes at least one bendable region and at least two unbendable regions, and the bendable region is connected between two of the unbendable regions adjacent to each other.

A plurality of holes are formed in the bendable region, and a projection of each of the holes on a plane perpendicular to the bending axis is spring-shaped.

In an embodiment of the present disclosure, when the elastic layer is bent around the bending axis, an extending direction of each of the holes is the same as a direction of the bending axis, or is perpendicular to the direction of the bending axis.

In an embodiment of the present disclosure, the bendable region includes: a first bending section formed with a plurality of first holes in the first bending section; and two of second bending sections symmetrically distributed on both sides of the first bending section, and formed with a plurality of second holes in each of the second bending sections.

In an embodiment of the present disclosure, a distribution density of the first holes is greater than a distribution density of the second holes.

In an embodiment of the present disclosure, a radius of curvature of the first holes is greater than a radius of curvature of the second holes.

In an embodiment of the present disclosure, the flexible display device further includes: a rebound layer disposed between the flexible display module and the elastic layer, and covering the elastic layer, wherein a material of the rebound layer is silicone plastic or styrofoam, and a thickness of the elastic layer is 0.02-3 mm.

In an embodiment of the present disclosure, the flexible display module includes a flexible display panel, a polarizing layer, and a covering window plate stacked and disposed on the elastic layer sequentially.

The flexible display module further includes a first adhesive layer and a second adhesive layer, the first adhesive layer is disposed between the covering window plate and the polarizing layer, and the second adhesive layer is disposed between the flexible display panel and the elastic layer.

In a second aspect, the present disclosure provides a flexible display device. The flexible display device includes a flexible display module; an attaching frame fixed and connected with the flexible display module; a bending component disposed under the flexible display module, and fixed and connected with the attaching frame; and an elastic layer disposed between the flexible display module and the bending component, and attached on a bottom of the flexible display module, wherein the elastic layer is bendable around a bending axis.

In an embodiment of the present disclosure, the elastic layer includes at least one bendable region and at least two unbendable regions, and the bendable region is connected between two of the unbendable regions adjacent to each other.

In an embodiment of the present disclosure, a plurality of holes are formed in the bendable region, and a projection of each of the holes on a plane perpendicular to the bending axis is spring-shaped.

In an embodiment of the present disclosure, when the elastic layer is bent around the bending axis, an extending direction of each of the holes is the same as a direction of the bending axis, or is perpendicular to the direction of the bending axis.

In an embodiment of the present disclosure, the bendable region includes: a first bending section formed with a plurality of first holes in the first bending section; and two of second bending sections symmetrically distributed on both sides of the first bending section, and formed with a plurality of second holes in each of the second bending sections.

In an embodiment of the present disclosure, a distribution density of the first holes is greater than a distribution density of the second holes.

In an embodiment of the present disclosure, a radius of curvature of the first holes is greater than a radius of curvature of the second holes.

In an embodiment of the present disclosure, the flexible display device further includes: a rebound layer disposed between the flexible display module and the elastic layer, and covering the elastic layer.

In an embodiment of the present disclosure, a material of the rebound layer is silicone plastic or styrofoam.

In an embodiment of the present disclosure, a thickness of the elastic layer is 0.02-3 mm.

In an embodiment of the present disclosure, the flexible display module includes a flexible display panel, a polarizing layer, and a covering window plate stacked and disposed on the elastic layer sequentially.

In an embodiment of the present disclosure, the flexible display module further includes a first adhesive layer and a second adhesive layer, the first adhesive layer is disposed between the covering window plate and the polarizing layer, and the second adhesive layer is disposed between the flexible display panel and the elastic layer.

In a third aspect, the present disclosure further provides a flexible display apparatus including the flexible display devices stated in any one of the above embodiments.

Beneficial Effects

In the embodiments of the present disclosure, a material is reduced by replacing the metal bending layer and the supporting layer in the existing technique with the elastic layer, so that a technical effect of the cost reduction of the flexible display device is achieved. Moreover, the technical effects of the characteristics of easy assembling and desirable flatness are also achieved by the structure of the single layer.

DETAILED DESCRIPTION OF EMBODIMENTS

The technical solutions in the embodiments of the present disclosure are clearly and completely described in the following description, which is combined with the drawings in the embodiments of the present disclosure. Obviously, the described embodiments are only a part of the embodiments of the present disclosure, not all embodiments. Based on the embodiments in the present disclosure, other embodiments obtained by those skilled in the art without paying any inventive effort are within the scope of the present disclosure.

In the description of the present disclosure, it is realized that the direction and position relationship indicated by the terms, such as [central], [longitudinal], [transversal], [length], [width], [upper], [lower], [front], [post], [left], [right], [vertical], [horizontal], [top], [bottom], [inside], [outside], are direction and position relationship based on the drawings of this disclosure. The terms only facilitate describing the present disclosure and simplifying the description, not indicate or imply that the devices or elements must have a specific direction, be configured, and operated in a specific direction. Therefore, the terms should not be realized to limit the present invention. Moreover, the terms "first" and "second" are used for descriptive purposes only, and cannot be realized as indicating or implying relative importance or implying the number of indicated technical features. Thus, the technical features defined as "first" and "second" may explicitly or implicitly include one or more of the technical features. In the description of the present disclosure, a meaning of "a plurality of" is two or more, unless specifically defined.

In the present disclosure, the term "exemplary" is used as an example, an illustration, or an explanation. Any embodiment described as "exemplary" in the present disclosure is not certainly interpreted to be more preferred or advantageous than other embodiments. The description is given below, so that those skilled in the art may realize and use the present disclosure. In the description below, details are stated for the purpose of explanation. It is understood that those skilled in the art may recognize that the present disclosure may be realized in the case of without using these specific details. In other examples, the commonly known structures and the processes are not described in detail, so as to prevent the description of the present disclosure from being obscure by the unnecessary details. Therefore, the present disclosure is not intended to be limited in the embodiments shown in the specification but is consistent with the broadest scope corresponding to the disclosed principles and the characteristics of the present disclosure.

An embodiment of the present disclosure provides a flexible display device and a flexible display apparatus. The flexible display device and the flexible display apparatus are respectively described in detail below.

Figure 1:
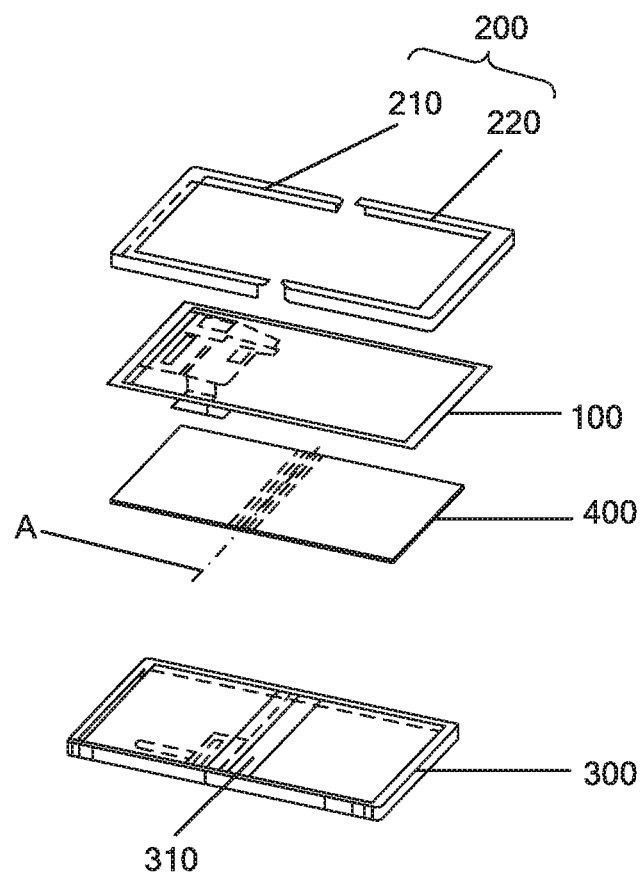
FIG. 1 is a schematic view of an integral structure of a flexible display device provided by an embodiment of the present disclosure.

Please refer to FIG. 1. The flexible display device includes:

a flexible display module 100;

an attaching frame 200 fixed and connected with the flexible display module 100;

a bending component 300 disposed below the flexible display module 100, and fixed and connected with the attaching frame 200; and an elastic layer 400 disposed between the flexible display module 100 and the bending component 300, and attached on a bottom of the flexible display module 100, wherein the elastic layer 400 is bendable around a bending axis A.

It may be seen from FIG. 1, a middle part of the bending component 300 is provided with a bendable region 310, and the attaching frame 200 includes a left attaching frame 210 and a right attaching frame 220 separated from each other. When the flexible display device is bent, the bendable region 310 of the bending component 300 is folded and it drives the elastic layer 400, the flexible display module 100, and the attaching frame 200 to be folded. Before the flexible display device is folded, the left attaching frame 210 and the right attaching frame 220 are on the same plane. After the flexible display device is folded, the left attaching frame 210 and the right attaching frame 220 are on a different plane.

Bendability of the flexible display device is achieved by providing the elastic layer 400 which is bendable around a bending axis A in an embodiment of the present disclosure. In the existing technique, the bendability of the flexible display device is achieved by a two-layer structure, and the assembling performance of the two-layer structure is poor, whereas the bendability of the flexible display device is achieved by the elastic layer 400 in the present disclosure, and a characteristic of easy assembling of the flexible display device is improved. Moreover, the technical problem of the poor flatness caused by the two-layer structure, which leads to poor display effect of the flexible display device, is avoided.

Figure 2:
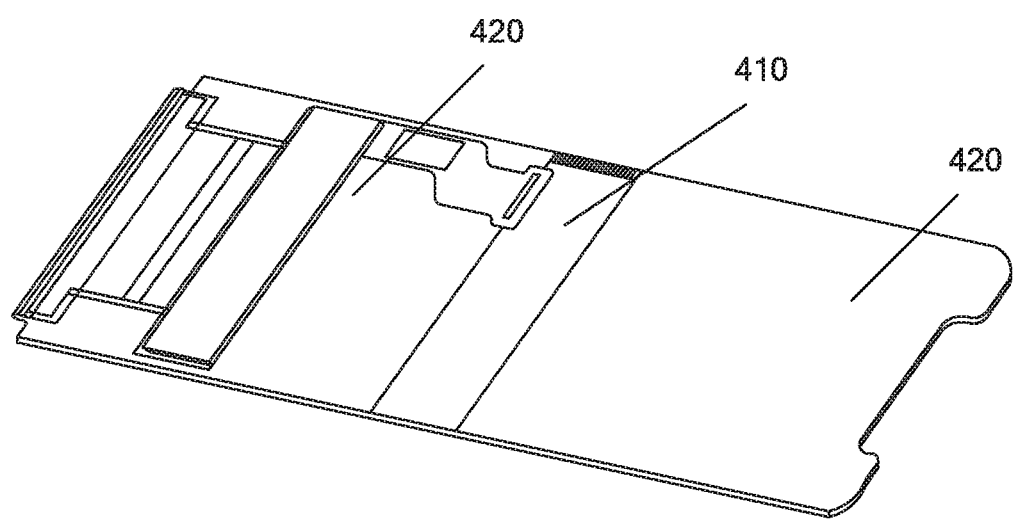
FIG. 2 is a schematic view of a structure of an elastic layer of a flexible display device provided by an embodiment of the present disclosure.

Further, in order to achieve the bendability of the flexible display device in the embodiments of the present disclosure, in some embodiments of the present disclosure, the elastic layer 400 includes at least one bendable region 410 and at least two unbendable regions 420 as shown in FIG. 2. The bendable region 410 is connected between two of the unbendable regions 420 adjacent to each other. Specifically, the bendability of the flexible display device is achieved by the bendable region 410, and a purpose for improving the characteristic of easy assembling of the flexible display device is achieved by the unbendable regions 420.

Specifically, in some embodiments of the present disclosure, the elastic layer 400 includes one bendable region 410 and two unbendable regions 420, wherein the bendable region 410 is formed in a middle part of the flexible display module 100, and the two unbendable regions 420 are symmetrically distributed on both sides of the bendable region 410, and connected with the bendable region 410. When the flexible display device is folded, the unbendable region 420 on one side of the bendable region 410 is folded along a bending axis A, and overlaps the unbendable region 420 on the other side of the bendable region 410.

In some embodiments of the present disclosure, a material of the elastic layer 400 is anyone of special use stainless (SUS), aluminum (Al), magnesium (Mg), and liquid metal. The elastic layer 400 made of the materials stated above has a desirable ductility. The desirable ductility makes the elastic layer 400 synchronously stretch, extend, and recover with the changing of the length of the flexible display module 100, give a space for the length of the flexible display device to change, and does not increase additional stress and strain for the flexible display device, so as to prevent the wrinkle formed in a folding condition and unfolding condition of the flexible display module 100, and ensure the flatness of the flexible display device.

Further, in order to achieve desirable strength and support of the flexible display device when the flexible display device is unfolded, a thickness of the elastic layer 400 is 0.02-3 mm. This thickness is convenient for assembling the flexible display device without adding additional assembling equipment of the flexible display device, and additional investment in equipment is reduced, so that an assembling cost of the flexible display device is reduced.

Figure 3:
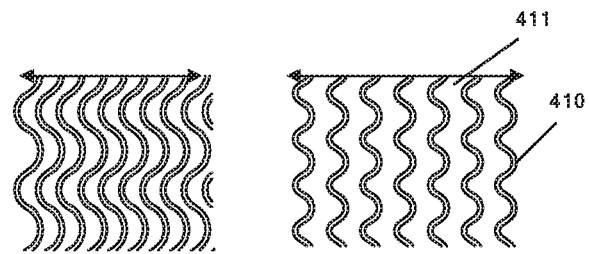
FIG. 3 is a schematic view of a structure of a bendable region of an elastic layer of a flexible display device provided by an embodiment of the present disclosure.

In order to increase the ductility of the elastic layer 400 and reduce a risk of peeling of the flexible display module, in some embodiments of the present disclosure, as shown in FIG. 3, a plurality of holes 411 are formed in the bendable region 410, and a projection of each of the holes 411 on a plane perpendicular to the bending axis A is spring-shaped.

Further, as the holes 411 shown in FIG. 3, when the elastic layer 400 is bent around the bending axis A, an extending direction of each of the holes 411 is the same as a direction of the bending axis A. Specifically, the ductility of the elastic layer 400 is increased at least ten times by the design of the holes 411, a space for releasing the stress of the flexible display device is further increases, and a relative dislocation between the elastic layer 400 and the flexible display panel 100 on the elastic layer 400 is reduced, so that a technical effect about reducing the risk of peeling is achieved. Moreover, the restore performance of each of the holes in a spring shape is great, so that a middle crease and unevenness of the flexible display panel 100 is reduced, and supporting strength of the flexible display device is further increased by structures of the holes 411 in a spring shape.

Figure 4:
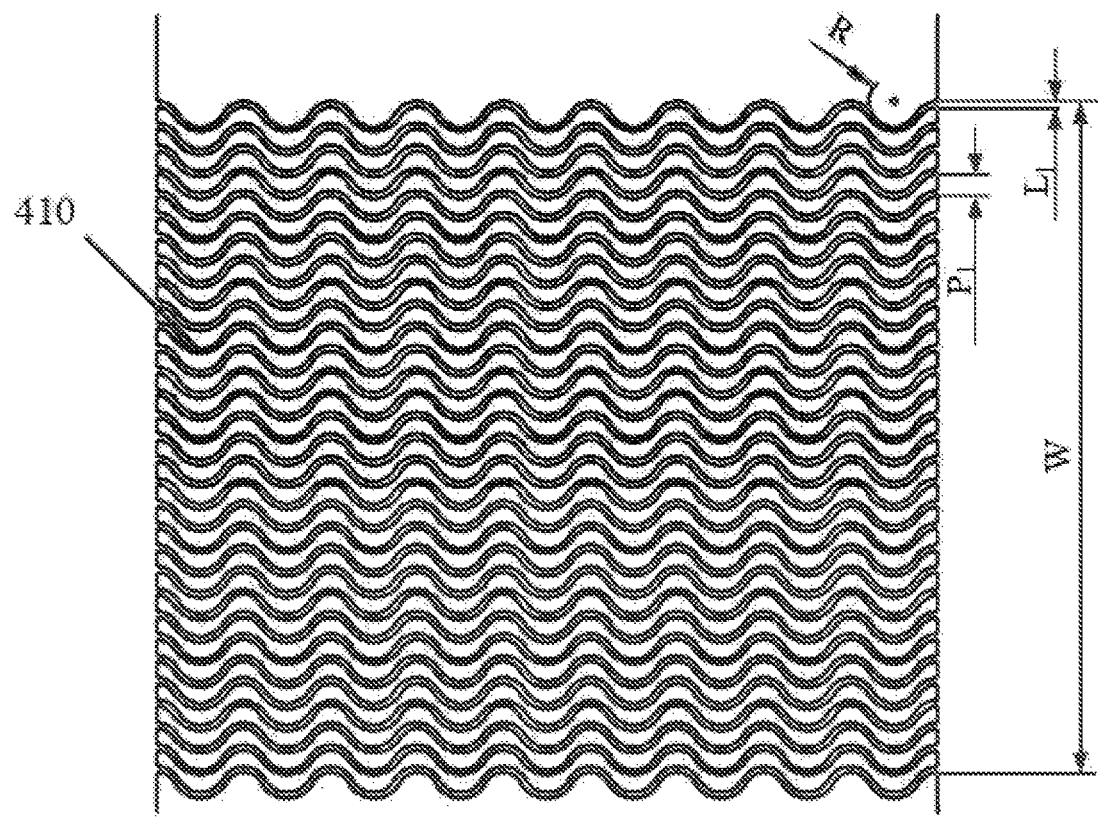
FIG. 4 is a schematic view of a structure of a plurality of holes in a bendable region of an elastic layer of a flexible display device provided by an embodiment of the present disclosure.

Specifically, in some embodiments of the present disclosure, as shown in FIG. 4, a spring-shaped metal strip is formed between two holes 411 adjacent to each other. A width of the spring-shaped metal strip is about 1 mm, and a width W of the bendable region 410 is not less than the width of the bendable region of the flexible display panel 100. The width W of the bendable region 410 is calculated by the formula below:

$$W=(n-1) \times P_1 + 2L_1$$

Wherein n is a quantity of the holes 411 in a direction of the width; P1 is a distance between two holes 411 adjacent to each other; and L1 is a width of the spring-shaped metal strip.

Further, each of the holes 411 includes a plurality of protrusions and depressions with the same shape and size. A radius of curvature R of each of the protrusions is calculated by the width of the bendable region 410, a total amount of deformation 1 when the elastic layer 400 is bent, and the quantity of the holes 411 in the direction of the width.

It is understood that the protrusions and the depressions of the holes 411 are not limited to a circle, but may also be a polygon.

Figure 5:
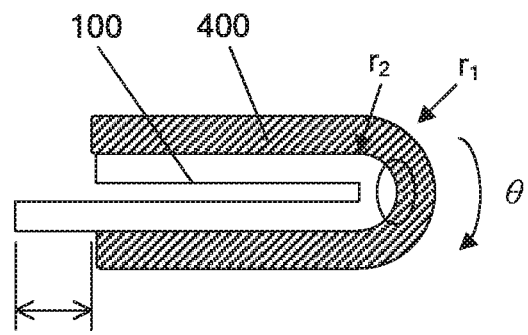
FIG. 5 is a schematic view of a structure of a flexible display device after bending provided by an embodiment of the present disclosure.

Specifically, as shown in FIG. 5, the flexible display panel 100 is a gray bar, and the elastic layer 400 is a black bar. The forming principle of the total amount of the deformation 1 during bending of the elastic layer 400 is stated below. When the flexible display device is flexibly folded, in order to make sure that the dislocation does not occur between the flexible display panel 100 and the elastic layer 400 during the flexibly bending, a length of the elastic layer 400 after folding is the same as a length of the flexible display panel 100 after flexibly folding. 1 is a variable length and size of the elastic layer 400 before flexibly folding and after flexibly folding. The calculating formula is as below:

$$1=\pi\theta(r_1-r_2)/180$$

Wherein θ is a bending angle of the flexible display device; r1 is a bending radius of the elastic layer 400; and r2 is a bending radius of the flexible display panel.

When the flexible display device is bent, the holes 411 stretch out and draw back like a spring by the holes 411 in spring shape provided in the embodiments of the present disclosure. In a bending process, after the force is applied, the holes 411 widen and recover, and a displacement compensation in the direction of the length is performed.

Figure 6:
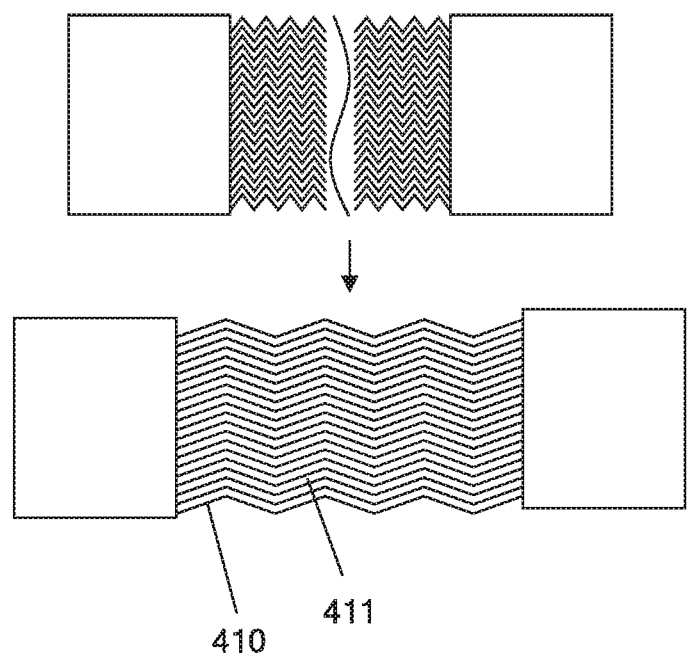
FIG. 6 is a schematic view of another structure of a plurality of holes in a bendable region of an elastic layer of a flexible display device provided by an embodiment of the present disclosure.

In addition to the arranging forms of the holes 411 in the embodiments stated above, in other embodiments of the present disclosure, as shown in FIG. 6, when the elastic layer 400 is bendable around the bending axis A, an extending direction of each of the holes 411 is the same as a direction of the bending axis A. The working principle in other embodiments is the same as the working principle in the embodiments stated above, and the technical effect achieved in other embodiments is the same as the technical effect achieved in the embodiments stated above too. Thus, the working principle and the technical effect achieved in other embodiments are not redundantly described here.

Figure 7:
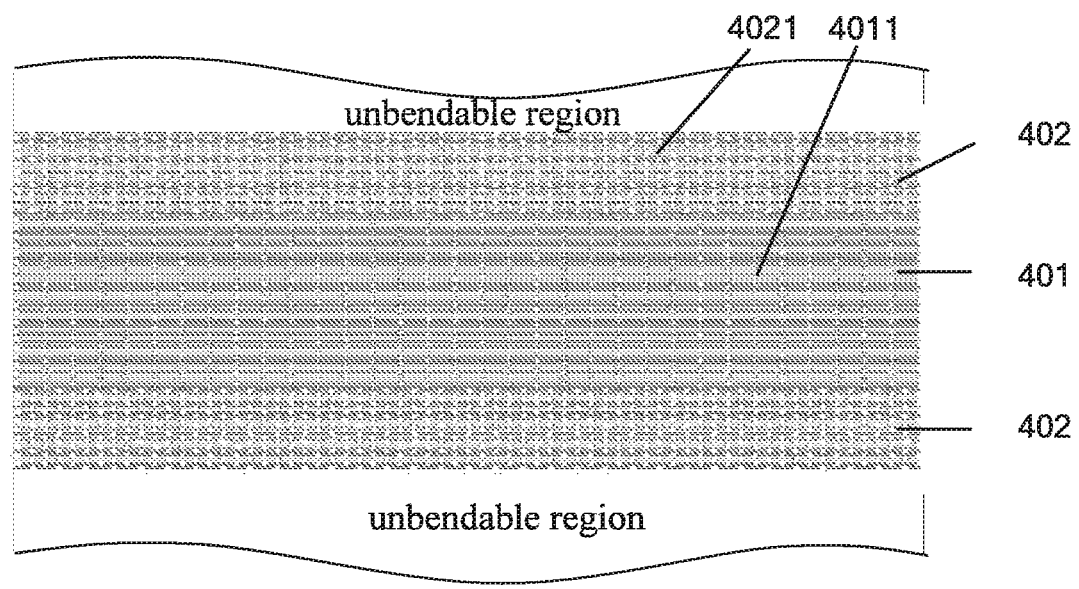
FIG. 7 is a schematic view of another structure of an elastic layer of a flexible display device provided by an embodiment of the present disclosure.

Further, in order to make the structure of the elastic layer 400 be more reasonable, in other embodiments, as shown in FIG. 7, the bendable region 410 includes:

a first bending section 401 formed with a plurality of first holes 4011 in the first bending section 401; and two of second bending sections 402 symmetrically distributed on both sides of the first bending section 401, and formed with a plurality of second holes 4021 in each of the second bending sections.

Because the deformation of the first bending section 401 is greater than the deformation of the second bending section 402 in the bending process of the flexible display device, a distribution density of the first holes 4011 is greater than a distribution density of the second holes 4021, and a radius of curvature of the first holes 4011 is greater than a radius of curvature of the second holes 4021.

Figure 8:
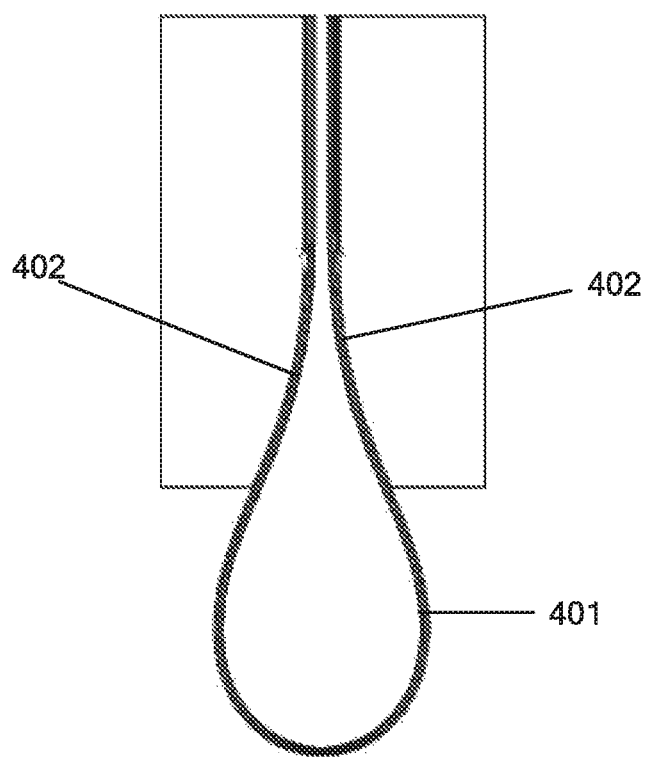
FIG. 8 is a schematic view of another structure of an elastic layer of a flexible display device after bending provided by an embodiment of the present disclosure.

Please refer to FIG. 8. When the flexible display device is folded, the deformation of the first bending section 401 increases, two of the second bending sections basically overlap each other, and the first bending section 401 is bent in a drop shape.

It is understood that the bendable region 400 is not limited to the first bending section 401 and a second bending section 402 but includes other bending sections besides the first bending section 401 and a second bending section 402 which are not redundantly described here.

Figure 9:
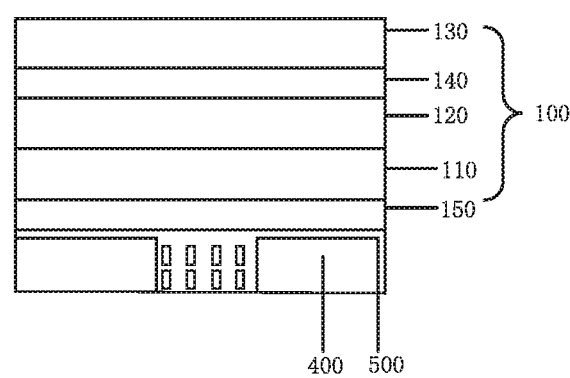
FIG. 9 is a schematic view of an integral structure of a flexible display device with a rebound layer provided by an embodiment of the present disclosure.

Further, the quantity of the holes 411 is limited by the material limitation of the elastic layer 400 and the size limitation of the elastic layer 400, and thus the ductility of the elastic layer 400 is limited. Therefore, in some embodiments of the present disclosure, as shown in FIG. 9, the flexible display device further includes a rebound layer 500 disposed between the flexible display module 100 and the elastic layer 400, and covering the elastic layer 400. A thickness of the rebound layer is 10-60 mm.

In some embodiments of the present disclosure, a material of the rebound layer 500 is silicone plastic or styrofoam. The silicone plastic is in a liquid state before curing and has desirable fluidity, and is formed on the elastic layer 400 by the screen printing. Moreover, the silicone plastic is easily and completely filled in the holes 411 arranged in the bendable region 410, and styrofoam is directly attached on a surface of the elastic layer 400.

In some embodiments of the present disclosure, the rebound layer 500 may synchronously dislocate with the upper layer structure, and the relative dislocation is greatly reduced by the high elasticity and ductility of silicone plastic or styrofoam, so that the technical problem of peeling does not occur. Because the filling design of the silicone plastic with high elasticity, the recovery property is desirable, and the marks and central ripple marks formed by folding are not easily seen due to the rapid recovery property. Thus, there is no need to worry about obvious creases and ripple marks and other poor appearance caused by the folding.

Further, in some embodiments of the present disclosure, as shown in FIG. 9, the flexible display module 100 includes: a flexible display panel 110, a polarizing layer 120, and a covering window plate 130 stacked and disposed on the elastic layer 400 sequentially.

The flexible display panel 110 is but not limited to products or components with a display function, such as liquid crystal display (LCD) panel, quantum dot light-emitting diodes (QLED) panel, electronic paper display (EPD), touch panel, flexible photovoltaic (PV) plate, and radio frequency identification.

In some embodiments of the present disclosure, the flexible display module 100 further includes a first adhesive layer 140 and a second adhesive layer 150, the first adhesive layer 140 is disposed between the covering window plate 130 and the polarizing layer 120, and the second adhesive layer 150 is disposed between the flexible display panel 110 and the elastic layer 400. Preferably, the first adhesive layer 140 and the second adhesive layer 150 are optically clear adhesive (OCA).

An embodiment of the present disclosure further provides a flexible display apparatus including the flexible display device stated above.

The flexible display device and the principle thereof provided by the embodiments of the present disclosure are described in detail as above. It is understood that the description of the embodiments is only for helping understand the core idea of the present disclosure, not aimed to limit the present disclosure. The description of characteristics and aspects in each exemplary embodiment of the present disclosure should be regarded as the similar characteristics and aspects applicable to other exemplary embodiments. Although the present disclosure is described by the reference examples, those skilled in the art may be suggested to make various modifications and replacements. The present disclosure aims to encompass these modifications and replacements within the scope of the claims, and the modifications, replacements, and improvement within the spirit and principle of the present disclosure should be included in the protected scope of the present disclosure.

What is claimed is:

1. A flexible display device, comprising:
   a flexible display module;
   an attaching frame fixed and connected with the flexible display module;
   a bending component disposed under the flexible display module, and fixed and connected with the attaching frame; and
   an elastic layer disposed between the flexible display module and the bending component, and attached on a bottom of the flexible display module, wherein the elastic layer is bendable around a bending axis;
   wherein the elastic layer comprises at least one bendable region and at least two unbendable regions, and the bendable region is connected between two of the unbendable regions adjacent to each other; and
   wherein a plurality of holes are formed in the bendable region, and a projection of each of the holes on a plane perpendicular to the bending axis is spring-shaped.

2. The flexible display device as claimed in claim 1, wherein when the elastic layer is bent around the bending axis, an extending direction of each of the holes is the same as a direction of the bending axis, or is perpendicular to the direction of the bending axis.

3. The flexible display device as claimed in claim 1, wherein the bendable region comprises:
 a first bending section formed with a plurality of first holes in the first bending section; and
 two of second bending sections symmetrically distributed on both sides of the first bending section, and formed with a plurality of second holes in each of the second bending sections.

4. The flexible display device as claimed in claim 3, wherein a distribution density of the first holes is greater than a distribution density of the second holes.

5. The flexible display device as claimed in claim 3, wherein a radius of curvature of the first holes is greater than a radius of curvature of the second holes.

6. The flexible display device as claimed in claim 1, wherein the flexible display device further comprises: a rebound layer disposed between the flexible display module and the elastic layer, and covering the elastic layer, wherein a material of the rebound layer is silicone plastic or styrofoam, and a thickness of the elastic layer is 0.02-3 mm.

7. The flexible display device as claimed in claim 1, wherein the flexible display module comprises: a flexible display panel, a polarizing layer, and a covering window plate stacked and disposed on the elastic layer sequentially; and
 wherein the flexible display module further comprises a first adhesive layer and a second adhesive layer, the first adhesive layer is disposed between the covering window plate and the polarizing layer, and the second adhesive layer is disposed between the flexible display panel and the elastic layer.

\* \* \* \* \*